US010567983B2

(12) United States Patent
Lei et al.

(10) Patent No.: US 10,567,983 B2
(45) Date of Patent: Feb. 18, 2020

(54) METHOD AND APPARATUS FOR ADAPTIVE NETWORK SLICING IN VEHICLES

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/025,442

(22) Filed: Jul. 2, 2018

(65) Prior Publication Data
US 2020/0008083 A1 Jan. 2, 2020

(51) Int. Cl.
H04W 24/04 (2009.01)
H04W 4/40 (2018.01)
H04W 88/02 (2009.01)

(52) U.S. Cl.
CPC ............ H04W 24/04 (2013.01); H04W 4/40 (2018.02); H04W 88/02 (2013.01)

(58) Field of Classification Search
CPC ..... H04W 4/007; H04W 74/08; H04W 16/14; H04B 17/345; H04B 17/327; H04B 17/336
See application file for complete search history.

(56) References Cited

U.S. PATENT DOCUMENTS

| 9,775,045 | B2 | 9/2017 | Li et al. | |
| 2011/0305147 | A1* | 12/2011 | Xu | H04L 41/5022 370/252 |
| 2012/0268294 | A1* | 10/2012 | Michaelis | G06F 9/451 340/905 |
| 2012/0275383 | A1* | 11/2012 | Matsukawa | H04W 72/10 370/328 |
| 2012/0303255 | A1* | 11/2012 | Wong | G05D 1/0274 701/300 |
| 2014/0140287 | A1* | 5/2014 | Cheng | H04W 76/10 370/329 |
| 2015/0145790 | A1* | 5/2015 | Kim | G02B 27/01 345/173 |
| 2016/0278111 | A1* | 9/2016 | Li | H04W 72/1242 |
| 2017/0201968 | A1 | 7/2017 | Nam et al. | |
| 2017/0279548 | A1* | 9/2017 | Dang | H04W 28/02 |
| 2017/0303290 | A1* | 10/2017 | Wu | H04W 76/18 |
| 2018/0020068 | A1* | 1/2018 | Devanneaux | H04L 67/26 |
| 2018/0077655 | A1* | 3/2018 | Zhou | H04W 52/34 |
| 2018/0211663 | A1* | 7/2018 | Shin | G10L 15/1815 |
| 2018/0239358 | A1* | 8/2018 | Choi | G05D 1/0212 |
| 2018/0270337 | A1* | 9/2018 | Kurauchi | H04L 41/0816 |

* cited by examiner

Primary Examiner — Chi Ho A Lee
Assistant Examiner — Andrew Lee
(74) Attorney, Agent, or Firm — Michael Spenner; Brooks Kushman P.C.

(57) ABSTRACT

A system includes a processor configured to determine that a first modem, predesignated to provide first communication services, is unable to provide the first communication services. The processor is also configured to determine that the first communication services have priority over second communication services, provided by a second modem predesignated to provide the second communication services. Further, the processor is configured to cease second communication services on the second modem and repurpose the second modem to provide the first communication services, responsive to the priority determination.

20 Claims, 4 Drawing Sheets

METHOD AND APPARATUS FOR ADAPTIVE NETWORK SLICING IN VEHICLES

TECHNICAL FIELD

The illustrative embodiments generally relate to methods and apparatuses for adaptive network slicing in vehicles.

BACKGROUND

The typical approach to mobile network optimization has been phone-centric, because mobile phones were the primary and intended use-cases for most modern mobile cellular networks (e.g., 4G). In more recent times, mobile networks have begun to service mobile phones, cellular modems (such as in-vehicle modems), broadband usages, etc.

The amount of information an autonomous vehicle may require to receive and transmit may be substantial relative to typical data needs. As such, networks may be sliced such that different slices of a network are oriented towards different perceived critical needs. One network slice may service a first need of an autonomous vehicle, and another network slice may service another need, depending on what particular functionality and/or criticality is dictated by the need.

SUMMARY

In a first illustrative embodiment, a system includes a processor configured to determine that a first modem, predesignated to provide first communication services, is unable to provide the first communication services. The processor is also configured to determine that the first communication services have priority over second communication services, provided by a second modem predesignated to provide the second communication services. Further, the processor is configured to cease second communication services on the second modem and repurpose the second modem to provide the first communication services, responsive to the priority determination.

In a second illustrative embodiment, a system includes a processor configured to receive a request of a first network-slice type, having a first priority associated therewith. The processor is also configured to determine that a first modem, predesignated to handle requests of the first type, is unable to provide connectivity services. The processor is further configured to determine that the first priority exceeds a second priority, associated with requests of a second network-slice type and responsively repurpose a second modem, predesignated to handle requests of the second type, to handle requests of the first type until either the second priority exceeds the first priority or the first modem becomes able to provide connectivity services.

In a third illustrative embodiment, a computer-implemented method includes repurposing a second modem, predesignated to handle requests of a second type having a second priority lower than the first priority, to handle requests of the first type, the repurposing being responsive to receiving a request of a first type having a first priority, and responsive to a modem, predesignated to handle requests of the first type, being unavailable to provide connectivity services.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
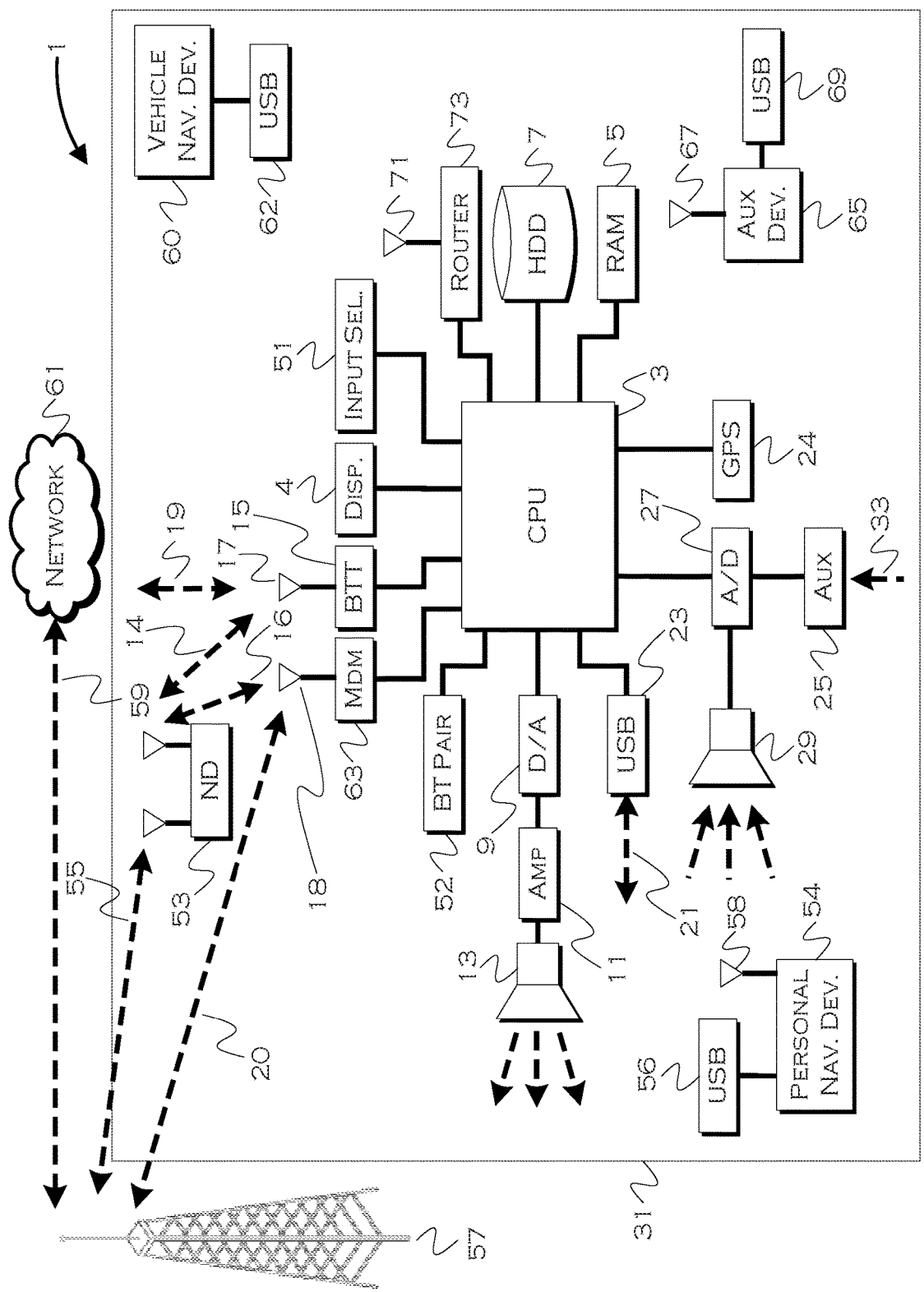
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In light of the data transfer needs, and disparity of needs, vehicles may be equipped with multiple cellular modems or other connectivity devices. Each device may have a primary purpose, such as a first telematics communication unit (TCU) modem being assigned a mobile broadband network slice for servicing an in-vehicle hotspot, and a second modem being assigned a mobile internet of things (IoT) slice. These modems may even use different network operators. The used-slices can be optimized for the particular intended use, so in this sense each modem can use a network slice that is optimized for the purpose for which the modem was intended.

While this strategy works as long as all used-networks are available and all modems are functioning, network outages, signal loss and modem malfunctions can cause a particular functionality to fail, rendering the vehicle services provided by that functionality unavailable.

For the sole purposes of explanation, examples will be described in terms of a two-modem two-network system, but the concepts scale to multiple modems and multiple networks as will be understood. Also, while failures may be discussed in terms of a network or part, failures could be ascribed to any portion of a given telematics component and accommodated according to the illustrative embodiments (e.g., if a decision is made based on a modem failure, that decision may also be made based on a network failure, in some instances). The examples will describe an autonomous vehicle (AV) modem X providing mission-critical IoT services using a mission-critical slice IoT network slice of network A, and a hotspot servicing modem Y providing mobile hotspot Wi-Fi for the vehicle using a broadband network slice of network B.

Generally speaking, if either modem fails and the services of the failed modem are currently prioritized, then the process can repurpose the still-working modem to provide those services. Similarly, if either network fails, the modem connected to the still-working network could switch slices (and services) in a similar manner, or the modem related to the failed network could also possibly use access credentials (if permitted) to the still-working network, and access the appropriate slice of that network, assuming that the still-working network allowed this type of access (two modems) and had the requisite slice available.

By allowing for dynamic and adaptive repurposing of onboard connectivity devices to support prioritized services, which can change with changing prioritizations, the illustrative concepts and embodiments provide opportunities to improve the utility and functionality of multiple connectivity devices using varied network slices to provide separate services. The novel, uncommon and atypical examples and concepts described herein demonstrate potential improvements achievable through use of those examples, concepts, and the like.

Figure 2:
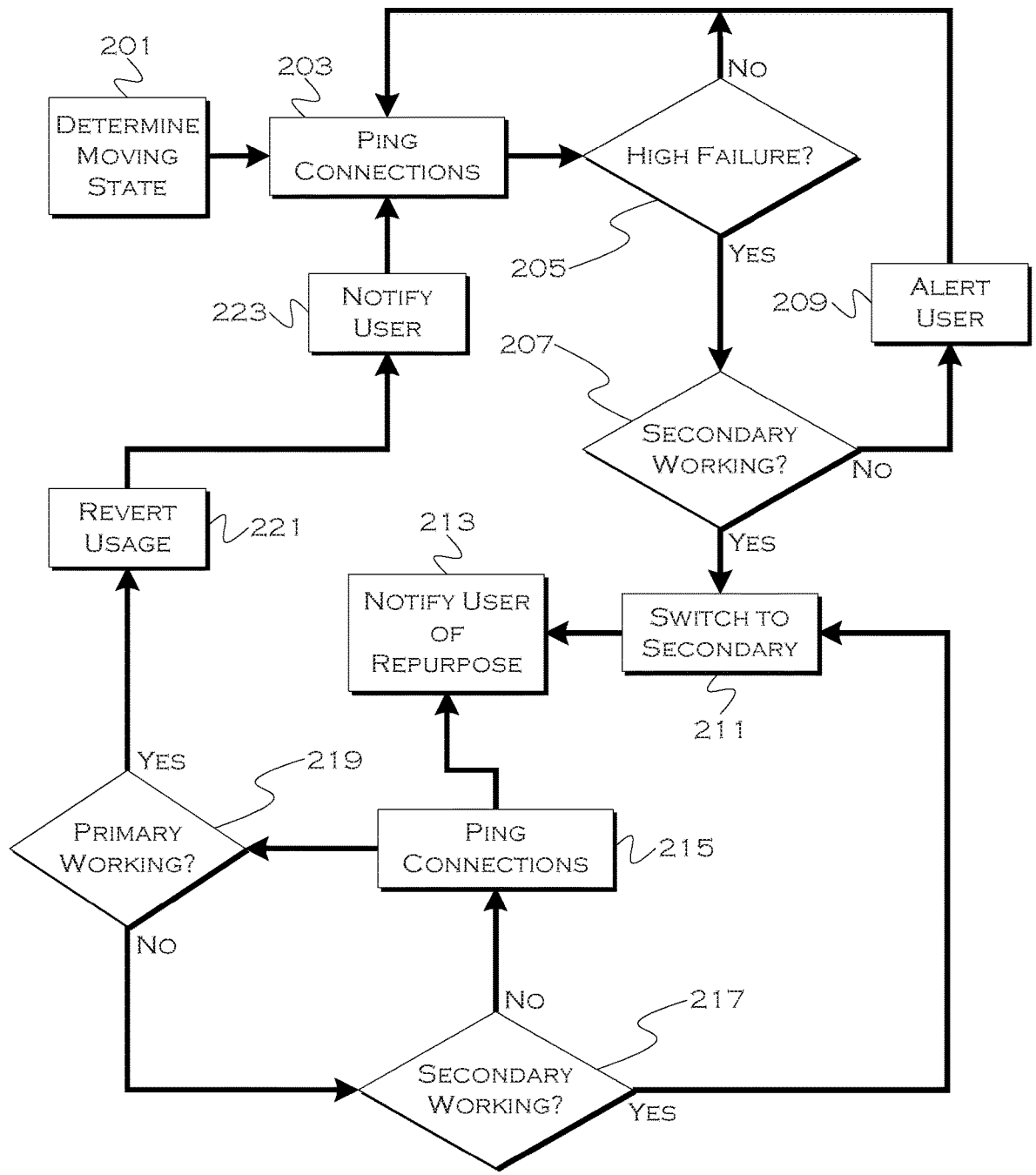
FIG. 2 shows an illustrative example of a process for modem-repurposing.

FIG. 2 shows an illustrative example of a process for modem-repurposing. In this example, the process determines 201 that a vehicle is in a moving state, or in a state whereby mission-critical IoT services, provided by modem X using network A, are prioritized because the vehicle is operating based on data received through the IoT slice of A used by X. At the same time, modem Y is using a broadband slice of network B to provide in-vehicle Wi-Fi (as a hotspot).

Because preference is given to the IoT services while the vehicle is in the current detected state (a state in which IoT services are prioritized), a loss of IoT connectivity may be problematic. This loss could be due to a failure of the modem X or the network A. Failure of the network can include, for example, degradation of signal to an unacceptable level or loss of network connection entirely. In this example, the process checks for such degradation by pinging 203 relevant connections or otherwise testing for high failure 205 rates. General tracking of signal strength may also be used in this manner, to determine if failure is occurring or imminent.

If the primary network (A in this example) is failing, the process checks to see if any secondary available network (through modem B, for example) is working 207. If no secondary networks are available, and a critical service may be lost, the process may alert 209 the user and take remedial action to mitigate the impact (e.g., park the vehicle or use other backup procedures).

If a secondary network is working and/or available, the process may use the other modem Y to switch 211 the services provided by Y, so that Y now accesses the IoT slice of network B (as opposed to the broadband slice). If modem X is still functioning, and if such action is permissible, the process may alternatively try to use modem X accessing an IoT slice of network B, allowing modem Y to continue functionality. But in this example, for the purpose of illustration, the process repurposes modem Y to be an IoT service providing modem using the IoT slice of B.

The process also notifies 213 the user of the repurposing, so the user is aware that, in this case, mobile hotspot services are going down temporarily. As long as the switch is ongoing, the process pings 215 (or otherwise checks) networks A and B, so that the process can confirm 217 that the secondary network is still working and that the primary network 219 is still unavailable. If the primary network becomes available again, the process may revert 221 to usage of that network and notify 223 the user that the previously unavailable services (e.g., hotspot) are once again available.

Figure 3:
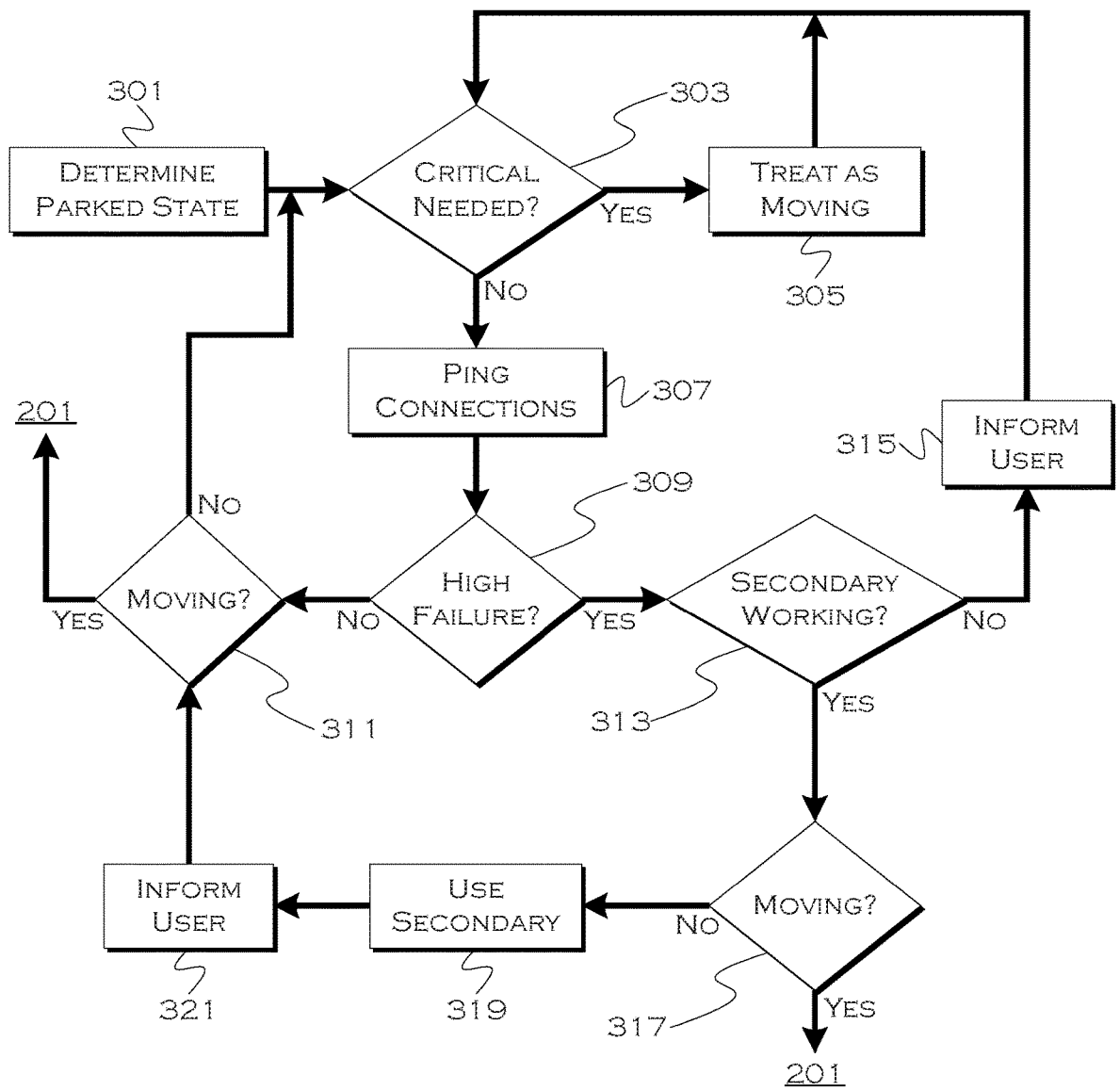
FIG. 3 shows a second illustrative process for modem-repurposing.

FIG. 3 shows a second illustrative process for modem-repurposing. In this example, the process may give preference to a connection that does not handle what are often critical functions, because in this example the vehicle is parked and does not require those functions. Thus, networks that function as so-called "secondary" networks can be reprioritized in certain circumstances, and the illustrative embodiments can accommodate such reprioritization.

In this example, the process detects 301 that the vehicle is in a parked state or other state where typical primary functions (e.g., IoT services) are not a chief consideration. In this example, because those IoT functions are so-called "critical" functions, there are a few more repetitive checks for a need for those functions, but such checks can be run in the background in an ongoing manner, and if the critical functions ever become needed, the process can terminate and branch to a process similar to that shown in FIG. 2.

Here, the process checks 303 to determine if the critical functions are needed, even though the vehicle is parked, and if so, the process treats 305 the vehicle as though it were in a moving state. That is just one example of how the process can adapt to further state variation, whereby the vehicle-state seems to indicate that motion functions are not needed, but wherein the motion functions are still needed (for what can be a variety of reasons).

If the critical functions are not needed, the process can begin checking connections by pinging 307 or otherwise measuring connection strength. If there is a high failure 309 on the network B (the network supporting hotspot capability) or if modem Y fails, the process can check to see if any secondary networks 313 are working. Here, the "secondary" networks include network X, since hotspot now has priority and thus the support of IoT services is a secondary consideration. If there are no alternative networks, the process can inform 315 the user that there are no available connections.

If a secondary network is available, the process can also determine if the vehicle has begun moving 317 (or otherwise needs the critical services). If the vehicle has begun moving, the process can engage a vehicle moving process such as that shown in FIG. 2. This may result in reprioritization of services, so could then also result in a change in decision making priorities for modem/slice usage (e.g., this process would have repurposed modem X for the services typically performed by modem Y, but now the modem X IoT services may have primacy again).

If the vehicle has not changed to a moving or other state in which reprioritization is desired, the process may use 319 the secondary modem (in this case, modem X) to provide modem Y services that are not functional on modem Y. The process also informs 321 the user that the switch has been made, or that IoT services (or whatever services previously provided by the repurposed modem) are not currently available. If the vehicle has not begun moving 311, the process can repeat, and can switch back to an initial state (each modem providing intended services through each intended network and network slice) if all connections are again functioning.

Figure 4:
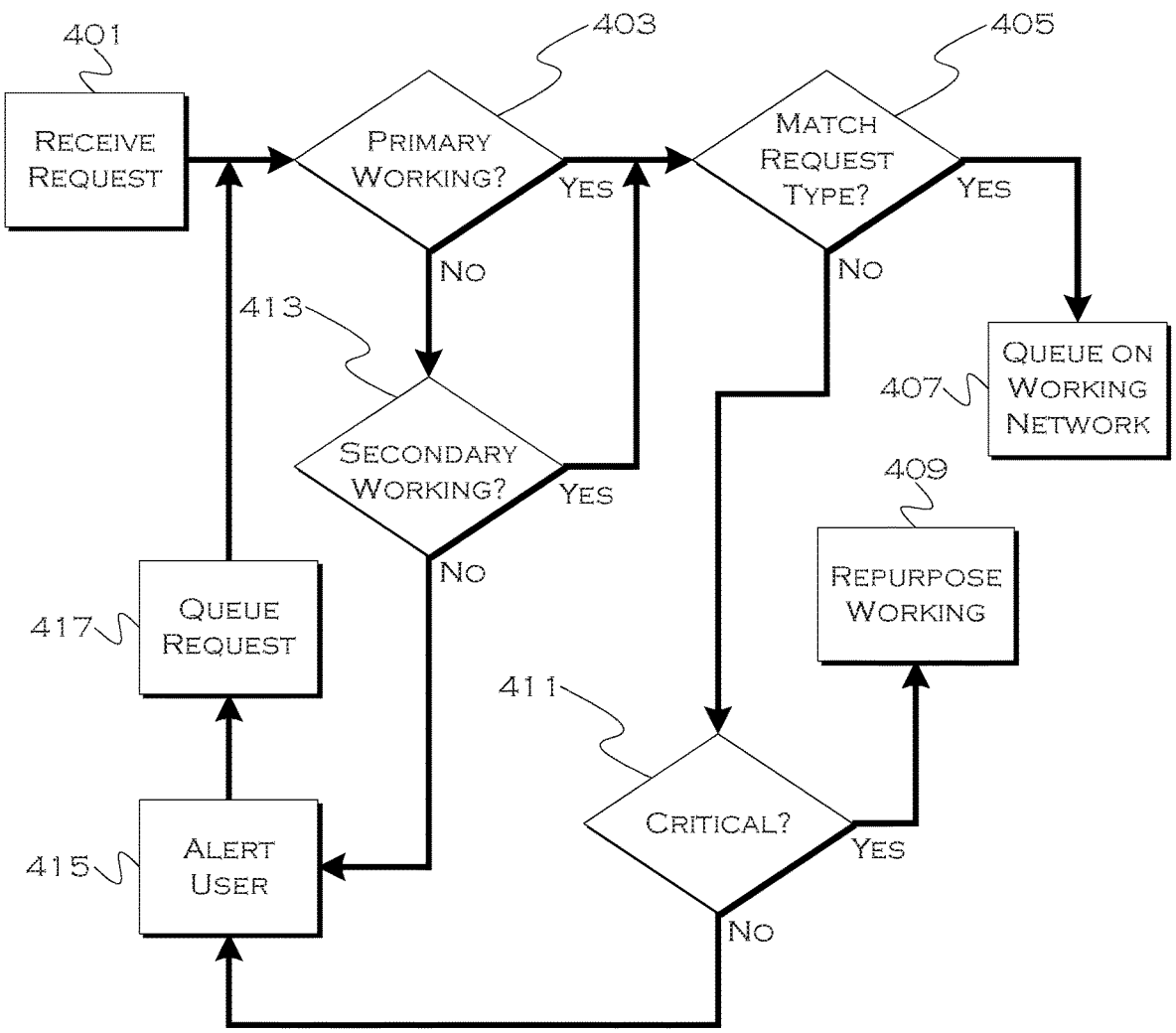
FIG. 4 shows an illustrative process for a generalized repurposing concept.

FIG. 4 shows an illustrative process for a generalized repurposing concept. This process is a more generalized example of swapping between modems based on prioritization and what modems are working.

In this example, the process receives a request 401 of a particular type. For purposes of this example, the requests are of type IoT and hotspot, but different services can also be provided by the modems. If the vehicle is moving or in a state where IoT services are necessary, those services will be considered "critical" for the purpose of this example.

After receiving the request, the process determines 403 if a primary modem corresponding to the request type (i.e., primarily designated to service the request type) is working. Just because the modem is connected, however, does not mean that it is currently servicing requests of that type, so the process also determines 405 if the current request-type matches the type currently being serviced by the designated primary modem. If the request is of the same type, the process queues 407 the request for that connection (assuming the request cannot be immediately serviced).

So, for example, the process could receive a request for a hotspot, and check modem Y (designated for hotspot services in the examples) to see if modem Y is working (403) and whether modem Y is currently servicing hotspot requests (405). If modem Y is the only working modem, for example, and if the IoT requests are currently critical, modem Y may be servicing IoT requests and thus the request type (hotspot) would not match the request type currently being handled by modem Y (critical).

If the request type does not match (as would be the case in the second instance above), the process determines 411 if the request is a critical request. In this case the request would not be critical, so the process would alert 415 the user that hotspot requests were unserviceable at this time, and may queue 417 the hotspot request for servicing if and when those requests are again being serviced (e.g., the vehicle parks or both modems are again available).

If the request was a critical request, the process could check the primary modem X (primary for critical requests in the examples) and if X was working, but servicing hotspot requests, the request type again would not match. In this case, however, the request is not merely an IoT request, but also a critical request 411 and so even if modem X is the only working modem and was servicing hotspot requests because no IoT critical requests were previously present, the system now repurposes 409 modem X to service the critical request and queues the just-received IoT critical request (or otherwise services the request once the modem has switched back to servicing IoT slice requests).

A similar strategy is presented for when the primary modem is not currently working, whereby a secondary modem is checked under similar constraints. That is, generally, if the secondary modem is working and servicing requests of the received-type, the process can queue/service the request using the secondary modem. If the secondary modem is working, but is servicing requests of a different type, the process can notify the user that the request is not serviceable, because the alternative modem is currently otherwise occupied with different types of requests. The exception to this second instance, in this example, would be if the primary modem for a critical request is not working, and the secondary modem is handling non-critical requests, the secondary modem would be repurposed in response to the critical request to now service the critical request, so that the critical request gets serviced as long as there is a modem available to service that request, regardless of what that modem was doing when the request was received.

The illustrative embodiments allow for dynamic and adaptive repurposing of modems primarily designated to service various types of requests. This can help ensure that critical requests are serviced, even in the event of modem or network failure, and can help service non-critical requests when critical requests are not required, but when the modem designated to service the non-critical request is unable to service the request in a primary intended manner (e.g., modem fails, network fails, etc).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
    a processor configured to:
    determine that a first vehicle modem, predesignated to provide first communication services, is unable to provide the first communication services;
    determine that the first communication services have priority over second communication services, provided by a second vehicle modem predesignated to provide the second communication services; and responsive to the priority determination, cease second communication services on the second modem and repurpose the second modem to provide the first communication services.

2. The system of claim 1, wherein the first communication services include internet of things services.

3. The system of claim 2, wherein the second communication services include mobile hotspot services.

4. The system of claim 3, wherein the determination that the first communication services have priority over the second communication services is based on a vehicle state.

5. The system of claim 4, wherein the vehicle state includes a driving state.

6. The system of claim 1, wherein the first communication services include mobile hotspot services.

7. The system of claim 6, wherein the second communication services include internet of things services.

8. The system of claim 7, wherein the determination that the first communication services have priority over the second communication services is based on a vehicle state.

9. The system of claim 8, wherein the vehicle state includes a parked state.

10. The system of claim 1, wherein the determination that the first modem is unable to provide the first communication services is based on a modem state.

11. The system of claim 1, wherein the determination that the first modem is unable to provide the first communication services is based on a network state.

12. The system of claim 11, wherein the network state includes a signal strength below a threshold predefined for providing the first communication services.

13. The system of claim 11, wherein the network state includes a network unavailability.

14. The system of claim 1, wherein the processor is further configured to:
determine that the first modem has become available to provide the first communication services after repurposing the second modem; and
responsive to the first modem becoming available, reverting to the first modem providing the first communication services and the second modem providing the second communication services.

15. A system comprising:
a processor configured to:
receive a request of a first network-slice type, having a first priority associated therewith;
determine that a first modem, predesignated to handle requests of the first type, is unable to provide connectivity services; and
determine that the first priority exceeds a second priority, associated with requests of a second network-slice type and responsively repurpose a second modem, predesignated to handle requests of the second type, to handle requests of the first type until either the second priority exceeds the first priority or the first modem becomes able to provide connectivity services.

16. The system of claim 15, wherein one of the first and second network-slice types includes an internet of things slice and the other of the first and second network-slice types includes a broadband slice.

17. The system of claim 15, wherein at least one of the first priority or second priority is based at least in part on vehicle operating state.

18. The system of claim 15, wherein the vehicle operating state includes the vehicle moving.

19. The system of claim 15, wherein the vehicle operating state includes the vehicle being parked.

20. A computer-implemented method comprising:
responsive to receiving a request of a first type having a first priority, and responsive to a modem, predesignated to handle requests of the first type, being unavailable to provide connectivity services, repurposing a second modem, predesignated to handle requests of a second type having a second priority lower than the first priority, to handle requests of the first type.

* * * * *